(12) United States Patent
Gudipati

(10) Patent No.: US 10,409,575 B2
(45) Date of Patent: Sep. 10, 2019

(54) SYSTEM AND METHOD FOR DEVELOPING SOFTWARE APPLICATIONS OF WEARABLE DEVICES

(71) Applicant: Cognizant Technology Solutions India Pvt. Ltd., Chennai (IN)

(72) Inventor: Ambaprasad Gudipati, Hyderabad (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 11 days.

(21) Appl. No.: 15/952,470

(22) Filed: Apr. 13, 2018

(65) Prior Publication Data
US 2019/0250896 A1 Aug. 15, 2019

(30) Foreign Application Priority Data
Feb. 9, 2018 (IN) .............................. 201841005006

(51) Int. Cl.
*G06F 8/54* (2018.01)
*G06F 8/30* (2018.01)
(Continued)

(52) U.S. Cl.
CPC .................. *G06F 8/54* (2013.01); *G06F 8/20* (2013.01); *G06F 8/30* (2013.01); *G06F 9/44521* (2013.01); *G06F 16/83* (2019.01)

(58) Field of Classification Search
CPC ..... G06F 8/20; G06F 8/30; G06F 8/54; G06F 8/44521; G06F 8/4428
(Continued)

(56) References Cited

U.S. PATENT DOCUMENTS 8,813,028 B2 * 8/2014 Farooqi .................... G06F 8/34
717/107
9,015,657 B2 4/2015 Akins
(Continued)

OTHER PUBLICATIONS

Jiang et al., "Software for Wearable Devices: Challenges and Opportunities" (Year: 2015).*
(Continued)

*Primary Examiner* — Phillip H Nguyen
(74) *Attorney, Agent, or Firm* — Cantor Colburn LLP

(57) ABSTRACT

A system and computer-implemented method for developing software applications of wearable devices is provided. The system comprises an application vision module configured to facilitate creation of a sitemap for applications of wearable devices and create application screens and a screen designer module configured to customize the application screens. The system further comprises a business logic module configured to generate code for business rules and business logic functions and link the generated code with the customized application screens and a database creation and interaction module configured to generate code for creating a local database on the wearable devices and link the generated code with the customized application screens. Furthermore, the system comprises a server mapping module configured to map the linked code with web services and a server database, an application structuring module configured to generate an application structure and code generators configured to generate native code of the applications.

17 Claims, 4 Drawing Sheets

(51) Int. Cl.
*G06F 16/83* (2019.01)
*G06F 9/445* (2018.01)
*G06F 8/20* (2018.01)

(58) Field of Classification Search
USPC .................................. 717/162, 160, 106
See application file for complete search history.

(56) References Cited

U.S. PATENT DOCUMENTS

| | | | |
|---|---|---|---|
| 9,081,579 | B2 | 4/2015 | Sharrma |
| 9,201,631 | B2 | 12/2015 | Friedman |
| 9,268,562 | B1 | 2/2016 | Mangtani |
| 9,507,609 | B2 | 11/2016 | Glazer |
| 10,073,911 | B2* | 9/2018 | Chang .................. G06F 16/951 |
| 10,290,133 | B2* | 5/2019 | Straub ..................... G06T 11/60 |
| 2006/0206861 | A1* | 9/2006 | Shenfield ................. G06F 8/35 717/106 |
| 2006/0206863 | A1* | 9/2006 | Shenfield ................. G06F 8/10 717/107 |
| 2008/0046557 | A1* | 2/2008 | Cheng .............. H04M 1/72525 709/224 |
| 2014/0007042 | A1* | 1/2014 | Channes .................. G06F 8/30 717/106 |
| 2014/0026113 | A1* | 1/2014 | Farooqi ..................... G06F 8/34 717/107 |
| 2016/0004515 | A1* | 1/2016 | Baeck ....................... G06F 8/30 717/109 |
| 2017/0031680 | A1 | 2/2017 | Kosmiskas |
| 2017/0091159 | A1 | 3/2017 | Su |

OTHER PUBLICATIONS

Oskar Gusgård, "Application Development for the Apple Watch" (Year: 2018).*
Zhang et al., "Analysis and Testing of Notifications in Android Wear Applications" (Year: 2017).*
Smailagic et al., "Application Design for Wearable and Context-Aware Computers" (Year: 2002).*
"Mobile Application Development", 2016, http://www.outworx.com/mobile-application-development-iOS-android-windows.php.
"Native, HTML5, or Hybrid: Understanding Your Mobile Application Development Options", 2016.
"Smart Watch Application Design and Development Smart Watch Mobile App Development, the Future and Beyond!", 2017, https://www.elegantmicroweb.com/technology/mobile-devices-smart-watches/smart-watches.htm.
Build and deploy apps with a mobile app development platform, 2017, http://searchmobilecomputing.techtarget.com/feature/Build-and-deploy-apps-with-a-mobile-app-development-platform.
Smartwatch Apps Developer Guide, 2015, http://intersog.com/blog/smartwatch-developer-guide/.
Smartwatch Platforms to Consider Developing for in 2015, 2015, https://www.sitepoint.com/smartwatch-platforms-to-consider-developing-for-in-2015.

* cited by examiner

SYSTEM AND METHOD FOR DEVELOPING SOFTWARE APPLICATIONS OF WEARABLE DEVICES

CROSS REFERENCE TO RELATED APPLICATION

This application is related to and claims the benefit of Indian Patent Application Number 201841005006 filed on Feb. 9, 2018, the contents of which are herein incorporated by reference in their entirety.

FIELD OF THE INVENTION

The present invention relates generally to developing software applications. More particularly, the present invention provides a system and method for developing software applications of wearable devices.

BACKGROUND OF THE INVENTION

Wearable devices such as the Apple Watch and the Android Wear have become quite popular in recent times and many businesses are looking for extending their existing mobile applications to wearable devices.

Conventionally, application developers use Mobile Application Development Platforms (MADPs) for generating code and developing mobile applications thereof. However, the existing platforms cannot be used for generating code for software applications of wearable devices as the hardware of these devices is quite different from the hardware of mobile phones. For example, Apple Watch and Android Wear have smaller display size. Also, navigation mechanism, Central processing Unit (CPU), Random Access Memory (RAM) and storage are quite different. Therefore, native code generated by current MADPs cannot be used for wearable devices such as the Apple Watch and Android Wear. Also, application development for wearable devices is time and resource consuming as applications for wearable devices demand different architecture, design thinking and programming paradigm. Moreover, applications need to be developed independently in specific programming languages for different types of wearable devices based on their operating system.

In light of the above-mentioned disadvantages, there is a need for a system and method for automatically developing software applications of wearable devices. Further, there is a need for a system and method that is capable of developing applications for wearable devices in a resource and time efficient manner. Furthermore, there is a need for a system and method that is capable of generating code for applications that are based on different operating systems. Also, there is a need for a system and method that does not require the developer to develop applications in a specific programming language.

SUMMARY OF THE INVENTION

A system, computer-implemented method and computer program product for developing software applications of wearable devices is provided. The system comprises an application vision module configured to facilitate creation of a sitemap for one or more applications under development of one or more wearable devices and create one or more application screens using one or more predefined templates based on the created sitemap. The system further comprises a screen designer module configured to customize the one or more application screens. Furthermore, the system comprises a business logic module configured to generate code for one or more business rules and business logic functions related to the one or more applications and link the generated code with the one or more customized application screens. The system also comprises a database creation and interaction module configured to generate code for creating a local database on the one or more wearable devices for the one or more applications and link the generated code with the one or more customized application screens. In addition, the system comprises a server mapping module configured to map the linked code corresponding to the one or more business rules and business logic functions and the linked code corresponding to the local database with one or more web services and a server database, wherein the server database is part of an existing enterprise system with which the one or more applications under development will interact for performing requisite business functions. The system also comprises an application structuring module configured to generate an application structure based on the one or more customized application screens after mapping with the one or more web services and the server database. The system further comprises one or more code generators configured to generate a native code of the one or more applications, specific to operating system of the one or more wearable devices, based on the generated application structure.

In an embodiment of the present invention, the sitemap comprises navigation flow of the one or more applications. In an embodiment of the present invention, the one or more wearable devices comprise Apple Watch and Android Wear. In an embodiment of the present invention, the local database is an embedded database. In an embodiment of the present invention, the local database is SQLite.

In an embodiment of the present invention, the application structure is an Extensible Markup Language (XML) representation of the one or more applications under development. In an embodiment of the present invention, the one or more code generators generate the native code in swift language for Apple watch. In an embodiment of the present invention, the one or more code generators comprise an Android Software Development Kit (SDK) that generates the native code in Java language for Android Wear.

The computer-implemented method for developing software applications of wearable devices, via program instructions stored in a memory and executed by a processor comprises creating a sitemap for one or more applications under development of one or more wearable devices. The computer-implemented method further comprises creating and customizing one or more application screens using one or more predefined templates based on the created sitemap. Furthermore, the computer-implemented method comprises generating code for one or more business rules and business logic functions related to the one or more applications and linking the generated code with the one or more customized application screens. The computer-implemented method also comprises generating code for creating a local database on the one or more wearable devices for the one or more applications and linking the generated code with the one or more customized application screens. In addition, the computer-implemented method comprises mapping the linked code corresponding to the one or more business rules and business logic functions and the linked code corresponding to the local database with one or more web services and a server database, wherein the server database is part of an existing enterprise system with which the one or more applications under development will interact for performing requisite business functions. The computer-implemented method further comprises generating an application structure based on the one or more customized application screens after mapping with the one or more web services and the server database. The computer-implemented method also comprises generating a native code of the one or more applications, specific to operating system of the one or more wearable devices, based on the generated application structure.

The computer program product for developing software applications of wearable devices comprises a non-transitory computer-readable medium having computer-readable program code stored thereon, the computer-readable program code comprising instructions that when executed by a processor, cause the processor to create a sitemap for one or more applications under development of one or more wearable devices. The processor further creates and customizes one or more application screens using one or more pre-defined templates based on the created sitemap. Furthermore, the processor generates code for one or more business rules and business logic functions related to the one or more applications and links the generated code with the one or more customized application screens. The processor also generates code for creating a local database on the one or more wearable devices for the one or more applications and links the generated code with the one or more customized application screens. In addition, the processor maps the linked code corresponding to the one or more business rules and business logic functions and the linked code corresponding to the local database with one or more web services and a server database, wherein the server database is part of an existing enterprise system with which the one or more applications under development will interact for performing requisite business functions. The processor further generates an application structure based on the one or more customized application screens after mapping with the one or more web services and the server database. The processor also generates a native code of the one or more applications, specific to operating system of the one or more wearable devices, based on the generated application structure.

BRIEF DESCRIPTION OF THE
ACCOMPANYING DRAWINGS

The present invention is described by way of embodiments illustrated in the accompanying drawings wherein.

DETAILED DESCRIPTION OF THE
INVENTION

A system and method for automatically developing software applications of wearable devices is described herein. The invention provides a system and method that is capable of developing applications for wearable devices in a resource and time efficient manner. The invention further provides a system and method that is capable of generating code for applications that are based on different operating systems. Furthermore, the invention provides a system and method that has a simple drag and drop interface which does not require the developer to develop applications for wearable devices in a specific programming language.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
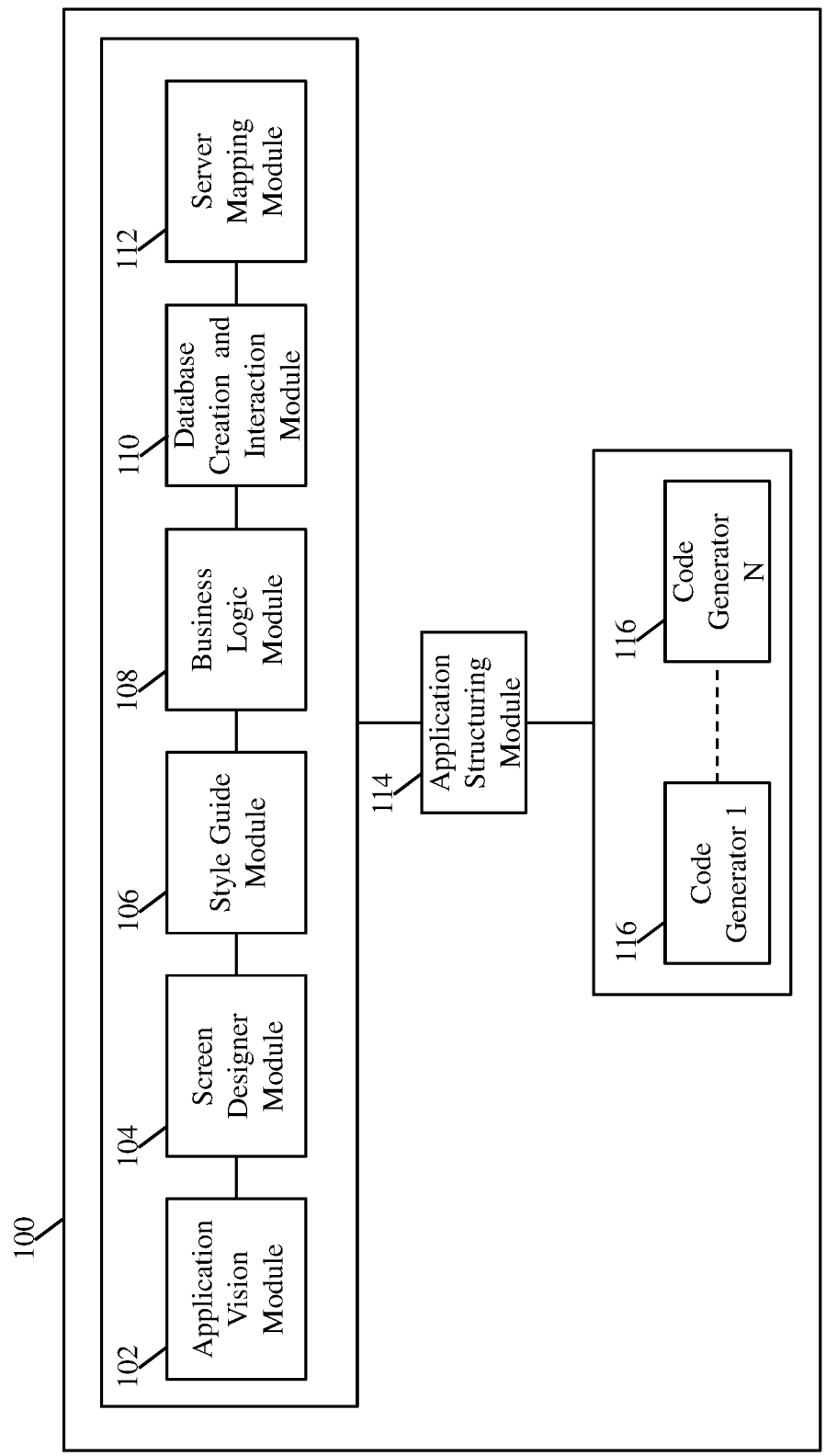
FIG. 1 is a block diagram illustrating a system for developing software applications of wearable devices.

FIG. 1 is a block diagram illustrating a system 100 for developing software applications of wearable devices, in accordance with an embodiment of the present invention. The system 100 comprises an application vision module 102, a screen designer module 104, a style guide module 106, a business logic module 108, a database creation and interaction module 110, a server mapping module 112, an application structuring module 114 and one or more code generators 116. In an embodiment of the present invention, the system 100 is a standalone device used for creating one or more applications of the wearable devices. In another embodiment of the present invention, the system 100 is hosted on a remote server and is accessible using one or more electronic communication devices via internet. In yet another embodiment of the present invention, the system 100 is hosted in a cloud computing environment.

The application vision module 102 is configured to create sitemap of one or more applications under development of one or more wearable devices. The sitemap comprises navigation flow of the one or more applications. The application vision module 102 enables the creator of the one or more applications to configure the navigation flow of the one or more applications. Further, configuring the navigation flow comprises creating the one or more application screens based on the created sitemap using one or more pre-defined templates. The application vision module 102 comprises various templates categorized into primary, secondary and leaf templates which are used for creating the application screens. The creator/developer of the one or more applications can create the navigation flow of the one or more screens of an application by dragging and dropping the one or more pre-defined templates on to a canvas provided by the application vision module 102 and connecting them based on requirement. Further, the application vision module 102 creates Data Definition Language or Data Description Language (DDL) and sample data for the tables which constitute model for the templates. Furthermore, the application vision module 102 provides one or more options to edit and delete templates from the navigation flow. The application vision module 102 generates a basic configuration of templates such that the application under development can be previewed without changing the configuration. The application vision module 102 then generates the required input for the screen designer module 104 for facilitating one or more application creators to further configure and customize the one or more applications under development in detail.

The screen designer module 104 is configured to facilitate the one or more application creators to perform detailed configuration and customization of each predefined template used for creating the one or more application screens of the application under development. Further, detailed configuration of each of the predefined template includes, but not limited to, configuring actions, model mapping with User Interface (UI), configuring each application screen in detail, configuring alignment of UI elements in multi form template and styling and mapping of business logic to provide logical flow to the one or more created and configured application screens. The screen designer module 104 creates DDL of specific UI elements such as, but not limited to, picker, single line and multi-line text elements, buttons, action sheets and alerts. The screen designer module 104 facilitates in providing UI elements for action center configurations such as, but not limited to, multi form for UI element type button, tool bar buttons and any other specific positions in the navigation flow. The screen designer module 104 also facilitates the one or more application creators to configure multiple actions. In an exemplary embodiment of the present invention, when a user taps on a button that displays details of a product, the application developer needs to configure the following actions such as, but not limited to, saving the current product preference of user in a local database, using the web service and fetching data corresponding to the product details, saving the fetched data in the local database of the wearable device and preparing the cart table in case the user taps on 'add to cart' thereby allowing multiple actions on one tap or click.

The style guide module 106 is configured to customize the one or more application screens after business logic mapping and detailed configuration. Further, the style guide module 106 provides options to the one or more application creators for styling and customizing the one or more application screens. Furthermore, customizing the one or more application screens include, but not limited to, configuring one or more styling parameters at template level. The one or more styling parameters include, but not limited to, background colors, images and font styles. In an embodiment of the present invention, the style guide module 106 provides default styles of, but not limited to, font, button and alignment (for example UI alignment in multi form template) for all types of templates. The style guide module 106 further enables addition of new styles and editing of existing styles. Once the one or more application creators customize the one or more application screens of the one or more applications under development, the styles and customizations are imported by the screen designer module 104 for each template corresponding to the one or more application screens.

The business logic module 108 is configured to encode business rules and business logic functions for ensuring that the one or more applications under development function in an expected manner. Further, the business logic module 108 facilitates in mapping the one or more configured application screens with the remainder of the software that facilitates managing database, displaying the user interface, leveraging system infrastructure and connecting various parts of the program.

In an embodiment of the present invention, the business logic module 108 is configured to encode the one or more business rules that facilitate the application in performing the business logic functions such as, but not limited to, fetching data from web services in JavaScript Object Notation (JSON) format, fetching data from the local database, processing the fetched data, posting the processed data to web services, initiating global variables, saving values entered by user into global variables (for example, user's mobile number), performing mathematical operations (for example, totaling value of items in cart and calculating delivery charges), interacting with hardware sensors and fetching information (for example, sensing GPS location and sensing heart beat) and creating intermediate data tables (for example, basket header table to do base calculations such as basket total before proceeding to invoice).

The database creation and interaction module 110 is configured to facilitate the one or more application creators to create a local embedded database for the application on the wearable device when the application is installed on the wearable device. Further, the database creation and interaction module 110 generates the code corresponding to the local embedded database. Furthermore, the database creation and interaction module 110 facilitates in accessing and controlling the local embedded database and corresponding data. In an embodiment of the present invention, the local embedded database is created in SQLite format. The database creation and interaction module 110 generates code to create relationships between data within the local embedded database. This helps in designing the business logic functions suitably and efficiently accessing the relational data stored in the created local database.

In an embodiment of the present invention, the database creation and interaction module 110 facilitates the one or more application creators to create tables, columns and default values for the created tables of the local embedded database. Further, the database creation and interaction module 110 supports operations such as, but not limited to, addition, editing and deletion on the table structure and table data. In an embodiment of the present invention, changing the structure of the table facilitates in changing the column type and name. In an embodiment of the present invention, the database creation and interaction module 110 supports various datatypes including, but not limited to, real, integer, string, long and double. In an exemplary embodiment of the present invention, the application creators are provided options to add single and multiple rows to the table data and delete a selected single row or multiple rows via the database creation and interaction module 110.

The server mapping module 112 is configured to map business logic, the one or more application screens and the local embedded database with one or more web services and a server database. The one or more web services are used to communicate with the server database. The server database is part of an existing enterprise/Line-Of-Business (LOB) system with which the one or more applications of the wearable devices under development will interact for performing requisite business functions. The server mapping module 112 also facilitates the application creators to map the server table with the table in the local database of the application so that application uses corresponding Uniform Resource Locator (URL) to fetch the server data. Furthermore, operations such as, but not limited to, updating existing tables and server URL and fetching and posting URLs in the server are supported by the server mapping module 112.

In an embodiment of the present invention, the server mapping module 112 in conjunction with the database creation and interaction module 110 facilitates in linking the local database with the customized application screens. Further, each customized application screen is linked with a table in the local database thereby ensuring that the screen appears instantly or the data is saved from the screen without any delay when the application is used on the wearable device. The server mapping module 112 also creates a mapping mechanism between the local database tables and the server tables using the JSON interface of the server database. The server mapping module 112 also generates code for distribution of data elements of the server side tables to multiple client tables within the local embedded database of the application thereby ensuring smooth transition.

The application structuring module 114 comprises an Extensible Markup Language (XML) representation of the one or more applications under development of the one or more wearable devices. The application structuring module 114 comprises all the information for rendering the UI elements, UI application behavior, business logic execution, business logic elements and database and web services interaction corresponding to the one or more applications under development. The application structuring module 114 facilitates the one or more application creators to generate the application structure of the one or more applications in XML format after completion of the configuration and mapping of the one or more applications under development. Once the structure of the application is generated, the one or more application creators generate the code for the application under development using the one or more code generators 116.

The one or more code generators 116 are sever based components that understand the structure of the one or more applications under development and generate corresponding native code. Further, each code generator 116 is configured to generate native code for a specific wearable device based on its operating system. In an embodiment of the present invention, the one or more code generators 116 generate the native code specifically for the Apple Watch in Swift language. In another embodiment of the present invention, the one or more code generators 116 comprise an Android Software Development Kit (SDK) that generates the native code in Java language for Android Wear. In an exemplary embodiment of the present invention, the code generated by the code generator 116 is ready for compilation without any requirement of a private key in case of Android Wear. In an exemplary embodiment of the present invention, the code generated by the code generator 116 is ready for compilation without any requirement of a developer certificate in case of Apple Watch.

Once the code is generated for the one or more applications of the one or more wearable devices, one or more files corresponding to the one or more applications are generated using the generated code. The one or more generated files are then uploaded to one or more application stores for downloading on the one or more wearable devices. On downloading the one or more generated files, the one or more corresponding applications are installed on the one or more wearable devices. The architecture of the one or more applications is discussed in detail in conjunction with FIG. 2.

Figure 2:
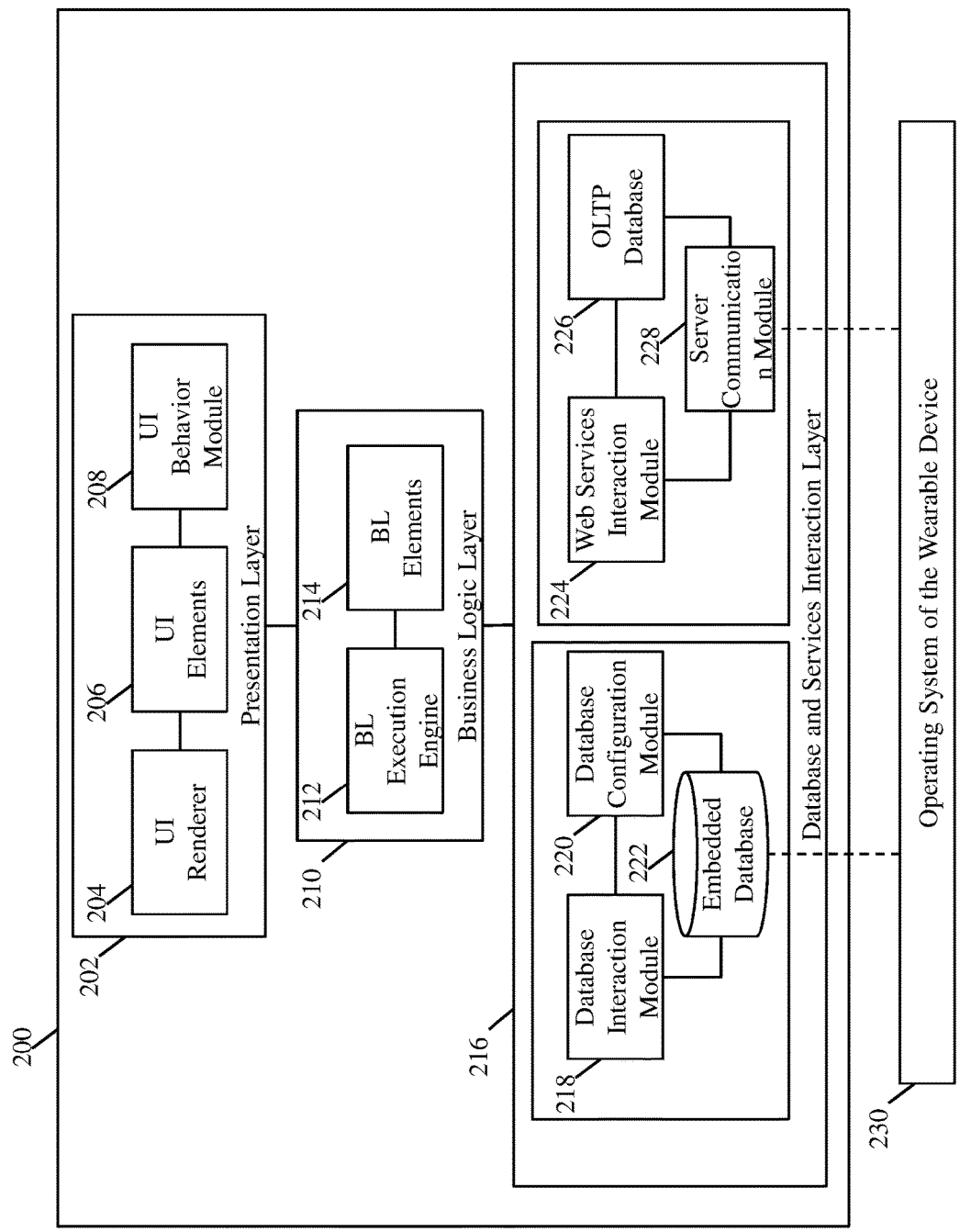
FIG. 2 is a detailed block diagram illustrating components of an application for a wearable device, in accordance with an embodiment of the present invention.

FIG. 2 is a detailed block diagram illustrating components of an application 200 for a wearable device, in accordance with an embodiment of the present invention. The application 200 comprises a presentation layer 202, a Business Logic (BL) layer 210, a DataBase and Services Interaction (DBSI) layer 216. The DBSI layer 216 interacts with Operating System (OS) 230 of the wearable device on which the application 200 is installed.

The presentation layer 202 is configured to facilitate application navigation and screen rendering on the one or more wearable devices on which the application 200 is installed. Further, the presentation layer 202 assists in rendering UI elements and components based on the application configuration. The presentation layer 202 comprises a UI renderer 204, UI elements 206 and a UI behavior module 208.

The UI renderer 204 is configured to interact with one or more hardware components of the wearable device via its operating system 230. In an embodiment of the present invention, the UI renderer 204 interacts with, but not limited to, display and speaker of the wearable device. Further, the UI renderer 204 is capable of, but not limited to, using display of the wearable device for rendering one or more application screens and displaying information and using audio output to deliver the information. In an exemplary embodiment of the present invention, the UI renderer 204 interacts with Scribble interface of the Apple Watch to decipher characters written by a user of the Apple Watch. In an embodiment of the present invention, the UI renderer 204 interacts with microphone to decipher voice input by the user.

The UI behavior module 208 is configured to ensure to ensure that the memory footprint of the application in the one or more wearable devices on which it is installed is less. The UI behavior module stores a single instance of UI element code corresponding to each UI element 206. Further, the UI element code is instantiated multiple times by the UI behavior module 208 as and when required and rendered via the UI renderer 204 on the display of the one or more wearable devices. Further, each instantiation of the one or more UI elements 206 require different parameters (such as, but not limited to, color and size) and different data element references which is managed by the UI renderer 204.

The business logic layer 210 acts as an interface between the presentation layer 202 and the DBSI layer 216. The business logic layer 210 comprise the one or more business rules that express business policy and workflows and specify order tasks for passing data from one participant to another. The business logic layer 210 also coordinates various functionalities of the application, processes commands, makes logic decisions and evaluations and performs calculations. The business logic layer 210 comprises a business logic execution engine 212 and one or more business logic elements 214. In an embodiment of the present invention, the business logic execution engine 212 interacts with one or more sensors of the wearable device via the operating system 230 to fetch relevant information and execute corresponding business rules. The one or more sensors include, but not limited to, heart beat sensor and accelerometer. The business logic execution engine 212 extracts context sensitive information and utilizes the extracted information during business rule parameterization. In an embodiment of the present invention, the BL execution engine 212 uses the Bluetooth of the wearable device to connect with another device such as, but not limited to, a mobile phone to obtain existing data. Further, obtaining the existing data accelerates the business logic execution by skipping certain steps in the business logic execution. For example, a user can login to his existing account on the application directly by connecting the wearable device via Bluetooth with mobile phone and skipping account authentication steps. In an embodiment of the present invention, a Global Positioning System (GPS) navigator of the wearable device is used to fetch location information which is used to execute business rules dependent on location. For example, business rules dependent on location include, but not limited to, computing delivery charges wherein easily accessible locations have less delivery charge and determining offers and discounts based on the location.

The DBSI layer 216 is configured to store and retrieve configurable application information from the local database created by the application on the wearable device and the file system of the one or more wearable device. The DBSI layer 216 is further configured to retrieve the information and send it to the business logic layer for processing. The data generated after processing is sent to the presentation layer 202.

The DBSI layer 216 comprises a database interaction module 218, a database configuration module 220, an embedded database 222, a Web Services Interaction (WSI) module 224, an OnLine Transaction Processing (OLTP) database 226 and a server communication module 228.

The database interaction module 218 facilitates interaction with the embedded database 222. The embedded database 222 is the local database created by the application on the one or more wearable device when the application is downloaded and installed. In an exemplary embodiment of the present invention, the embedded database 222 is SQLite. The application uses the embedded database for persisting and retrieving data. Further, the application creators and developers are able to create and modify the structure of the embedded database 222 via the database creation and interaction module 110 (FIG. 1) by providing initial instructions to the database configuration module 220 at the time of installation. The database configuration module 220 also has the capability to receive further instructions at runtime to create and modify the structure of the embedded database 222.

The embedded database 222 is capable of hosting multiple database files. Further, one or more database files are used for On-Line Transaction Processing (OLTP) instead of temporary storages. These database files are illustrated as OLTP database 226. Further, using multiple database files (OLTP database 226) facilitates structured interactions and ability to store temporary information. In an exemplary embodiment of the present invention, temporary information in an e-commerce application include, but not limited to, details of items in basket or cart. In an exemplary embodiment of the present invention, temporary information in a healthcare application include, but not limited to, intermediate calculations of health parameters. The web services interaction module 224 facilitates interaction with the server of the existing enterprise system using the one or more web services. The server communication module 228 facilitates communication with the server endpoints of the existing enterprise system to fetch and post relevant information during the application execution and use.

The DBSI layer 216 also allows the application 200 to interact with the one or more web services for retrieving and updating data from the existing enterprise/LOB system. In an exemplary embodiment of the present invention, the WSI module 224 utilizes the cellular network and Wi-Fi antennas to interact with the LOB web services or any cloud based web services to exchange JavaScript Object Notation (JSON) data over REpresentational State Transfer (REST) protocol.

In an embodiment of the present invention, the database interaction module 220 interacts with the in-built memory of the wearable device and the server database to retrieve and store data in the embedded database 222 for immediate use so as to reduce network latency. Further, the database interaction module 220 ensures that stale data is not used by retrieving time stamp corresponding to the data stored in the embedded database 222 and comparing with server time stamp at every server interaction request. On comparison, if the time stamps match then no data is downloaded otherwise data is retrieved again. In an embodiment of the present invention, storing data along with time stamp in the embedded database 222 is advantageous in e-commerce application for maintaining catalogs. In an embodiment of the present invention, storing data with the time stamp in the embedded database 222 is advantageous in healthcare application for updating list of hospitals, updating list of healthcare professionals, updating doctors' schedule and the likes.

In an embodiment of the present invention, the system 100 (FIG. 1) is capable of generating code, for an application 200 of a wearable device, required for linking an existing mobile application with the generated application so as to enable authentication and information exchange between the existing mobile application and the newly developed application for the wearable device.

Figure 3:
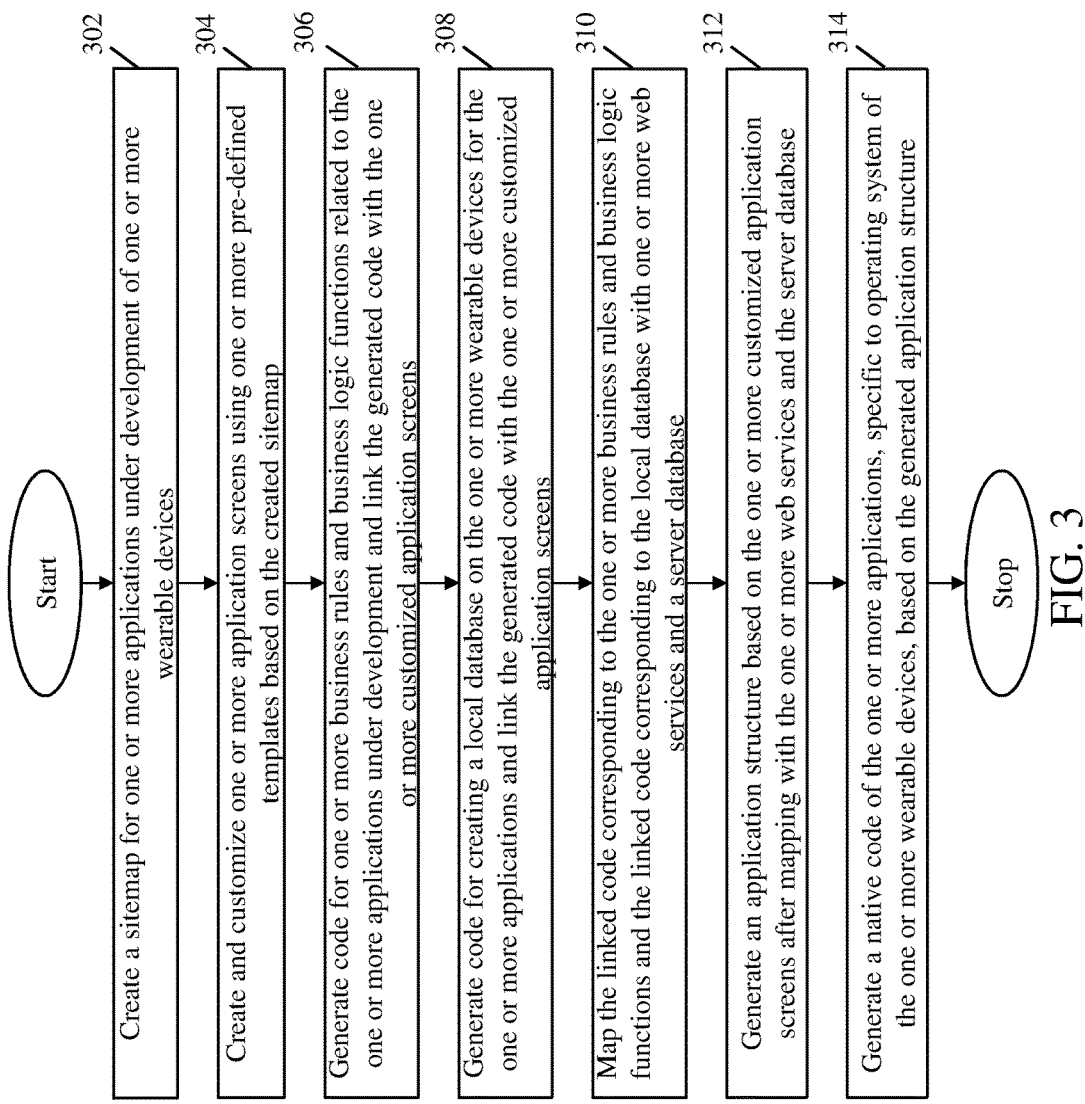
FIG. 3 is a flowchart illustrating a method for developing software applications of wearable devices, in accordance with an embodiment of the present invention.

FIG. 3 is a flowchart illustrating a method for developing software applications of wearable devices, in accordance with an embodiment of the present invention.

At step 302, a sitemap for an application of one or more wearable devices is created. The sitemap is created by one or more application creators/developers. Further, creating the sitemap comprise configuring navigation flow of the application.

At step 304, one or more application screens are created and customized using one or more pre-defined templates based on the created sitemap. The one or more pre-defined templates are categorized into primary, secondary and leaf templates. The creator(s) of the one or more applications can create the navigation flow of the one or more screens of an application by dragging and dropping the one or more pre-defined templates on to a canvas and connecting them based on requirement. Further, the one or more application creators are provided one or more options to edit and delete templates from the navigation flow. The one or more application creators are also provided with one or more options for customizing the one or more created application screens. Further, customizing the one or more application screens include, but not limited to, configuring actions, model mapping with User Interface (UI), configuring each application screen in detail, configuring alignment of UI elements in multi form template and styling and mapping of business logic to provide logical flow to the one or more created application screens.

At step 306, code for one or more business rules and business logic functions related to the application is generated. Further, the generated code is linked with the one or more customized application screens. Furthermore, generating the code for the one or more business rules and business logic functions ensures that the application under development is capable of performing requisite business functions in an expected manner. In an embodiment of the present invention, the one or more business rules facilitate the application in performing the business logic functions such as, but not limited to, fetching data from web services in JavaScript Object Notation (JSON) format, fetching data from the local database, processing the fetched data, posting the processed data to web services, initiating global variables, saving values entered by user into global variables (for example, user's mobile number), performing mathematical operations (for example, totaling value of items in cart and calculating delivery charges), interacting with hardware sensors and fetching information (for example, sensing GPS location and sensing heart beat) and creating intermediate data tables (for example, basket header table to do base calculations such as basket total before proceeding to invoice).

At step 308, code for creating a local database on the one or more wearable devices for the application is generated. The generated code is linked with the one or more customized application screens. In an embodiment of the present invention, the local database is SQLite.

At step 310, the linked code corresponding to the one or more business rules and business logic functions and the linked code corresponding to the local database is mapped with one or more web services and a server database. The one or more web services are used to communicate with the server database. The server database is part of an existing enterprise/Line-Of-Business (LOB) system with which the one or more applications of the wearable devices under development will interact for performing requisite business functions. The application creators map the server table with the table in the local database of the application so that application uses corresponding Uniform Resource Locator (URL) to fetch the server data.

At step 312, an application structure is generated based on the one or more customized application screens after mapping with the one or more web services and the server database. In an embodiment of the present invention, the application structure is an XML representation of the one or more applications under development. Further, the application structure is generated after completion of the configuration and mapping of the one or more applications under development based on the one or more customized application screens.

At step 314, native code of the one or more applications, specific to operating system of the one or more wearable devices, is generated based on the generated application structure. Further, the native code is generated by one or more code generators. The one or more code generators are sever based components that understand the structure of the one or more applications under development and generate corresponding native code. In an embodiment of the present invention, the one or more code generators generate the native code specifically for the Apple Watch in Swift language. In another embodiment of the present invention, the one or more code generators 116 comprise an Android Software Development Kit (SDK) that generates the native code in Java language for Android Wear.

Figure 4:
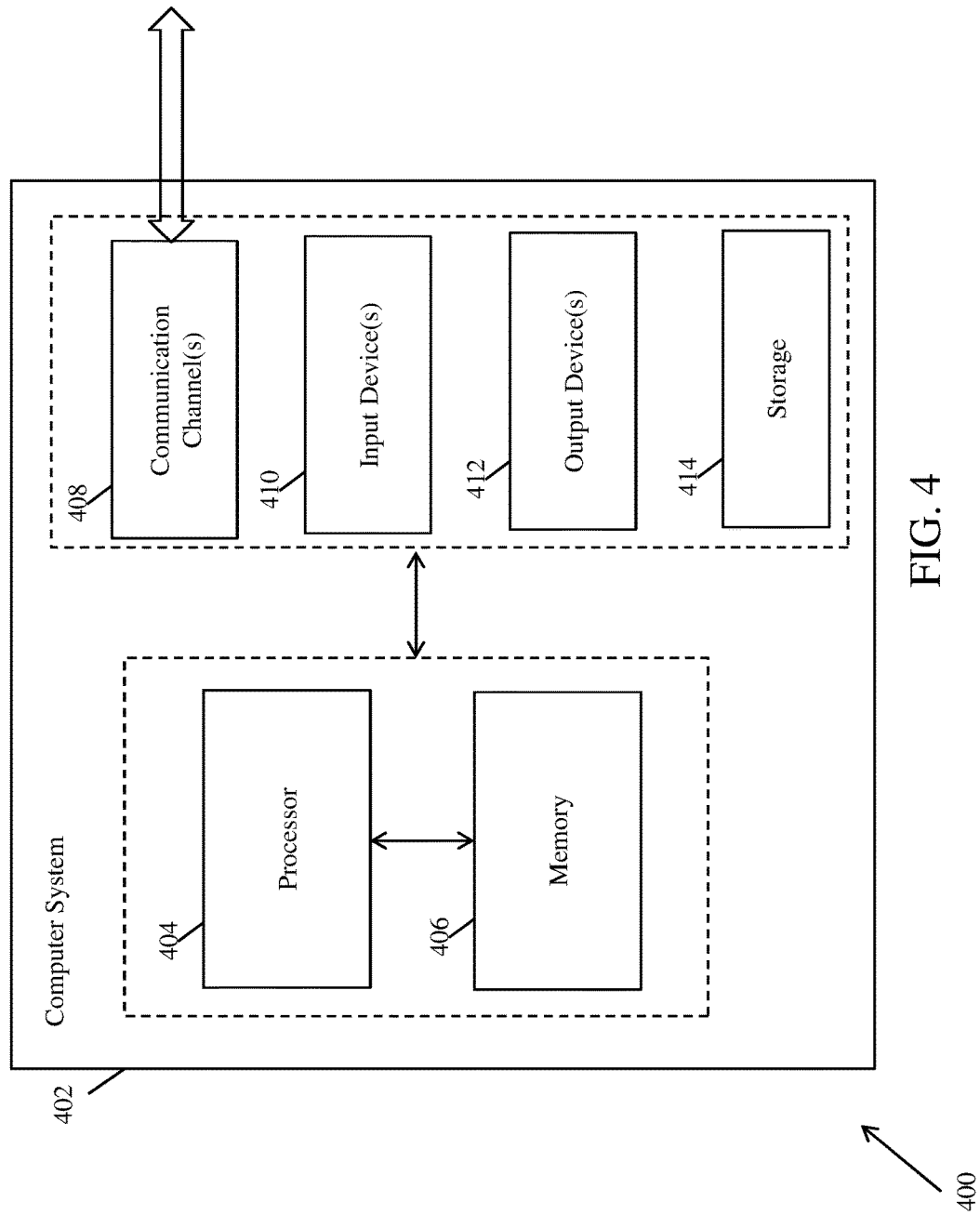
FIG. 4 illustrates an exemplary computer system for developing software applications of wearable devices, in accordance with an embodiment of the present invention.

FIG. 4 illustrates an exemplary computer system for developing software applications of wearable devices, in accordance with an embodiment of the present invention.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A system for developing software applications of wearable devices, the system comprising:
a memory storing program instructions;
a processor configured to execute program instructions stored in the memory;
an application vision module, executed by the processor, configured to:
facilitate creation of a sitemap for one or more applications under development of one or more wearable devices; and
create one or more application screens using one or more predefined templates based on the created sitemap;
a screen designer module, executed by the processor, configured to customize the one or more application screens;
a business logic module, executed by the processor, configured to generate code for one or more business rules and business logic functions related to the one or more applications and link the generated code with the one or more customized application screens;
a database creation and interaction module, executed by the processor, configured to generate code for creating a local database on the one or more wearable devices for the one or more applications and link the generated code with the one or more customized application screens;
a server mapping module, executed by the processor, configured to map the linked code corresponding to the one or more business rules and business logic functions and the linked code corresponding to the local database with one or more web services and a server database, wherein the server database is part of an existing enterprise system with which the one or more applications under development will interact for performing requisite business functions;
an application structuring module, executed by the processor, configured to generate an application structure based on the one or more customized application screens after mapping with the one or more web services and the server database; and
one or more code generators, executed by the processor, configured to generate a native code of the one or more applications, specific to operating system of the one or more wearable devices, based on the generated application structure.

2. The system of claim 1, wherein the sitemap comprises navigation flow of the one or more applications.

3. The system of claim 1, wherein the one or more wearable devices comprise Apple Watch and Android Wear.

4. The system of claim 1, wherein the local database is an embedded database.

5. The system of claim 1, wherein the local database is SQLite.

6. The system of claim 1, wherein the application structure is an Extensible Markup Language (XML) representation of the one or more applications under development.

7. The system of claim 1, wherein the one or more code generators generate the native code in swift language for Apple watch.

8. The system of claim 1, wherein the one or more code generators comprise an Android Software Development Kit (SDK) that generates the native code in Java language for Android Wear.

9. A computer-implemented method for developing software applications of wearable devices, via program instructions stored in a memory and executed by a processor, the computer-implemented method comprising:
creating a sitemap for one or more applications under development of one or more wearable devices;
creating and customizing one or more application screens using one or more pre-defined templates based on the created sitemap;
generating code for one or more business rules and business logic functions related to the one or more applications and linking the generated code with the one or more customized application screens;
generating code for creating a local database on the one or more wearable devices for the one or more applications and linking the generated code with the one or more customized application screens;
mapping the linked code corresponding to the one or more business rules and business logic functions and the linked code corresponding to the local database with one or more web services and a server database, wherein the server database is part of an existing enterprise system with which the one or more applications under development will interact for performing requisite business functions;
generating an application structure based on the one or more customized application screens after mapping with the one or more web services and the server database; and
generating a native code of the one or more applications, specific to operating system of the one or more wearable devices, based on the generated application structure.

10. The computer-implemented method of claim 9, wherein the sitemap comprises navigation flow of the one or more applications.

11. The computer-implemented method of claim 9, wherein the one or more wearable devices comprise Apple Watch and Android Wear.

12. The computer-implemented method of claim 9, wherein the local database is an embedded database.

13. The computer-implemented method of claim 9, wherein the local database is SQLite.

14. The computer-implemented method of claim 9, wherein the application structure is an Extensible Markup Language (XML) representation of the one or more applications under development.

15. The computer-implemented method of claim 9, wherein the one or more code generators generate the native code in swift language for Apple watch.

16. The computer-implemented method of claim 9, wherein the one or more code generators comprise an Android Software Development Kit (SDK) that generates the native code in Java language for Android Wear.

17. A computer program product for developing software applications of wearable devices, the computer program product comprising:
a non-transitory computer-readable medium having computer-readable program code stored thereon, the computer-readable program code comprising instructions that when executed by a processor, cause the processor to:

create a sitemap for one or more applications under development of one or more wearable devices;

create and customize one or more application screens using one or more pre-defined templates based on the created sitemap;

generate code for one or more business rules and business logic functions related to the one or more applications and linking the generated code with the one or more customized application screens;

generate code for creating a local database on the one or more wearable devices for the one or more applications and link the generated code with the one or more customized application screens;

map the linked code corresponding to the one or more business rules and business logic functions and the linked code corresponding to the local database with one or more web services and a server database, wherein the server database is part of an existing enterprise system with which the one or more applications under development will interact for performing requisite business functions;

generate an application structure based on the one or more customized application screens after mapping with the one or more web services and the server database; and generate a native code of the one or more applications, specific to operating system of the one or more wearable devices, based on the generated application structure.

* * * * *